United States Patent [19]
Clopton

[11] Patent Number: 5,137,145
[45] Date of Patent: Aug. 11, 1992

[54] CONVEYOR SYSTEM

[75] Inventor: Robert T. Clopton, Magnolia, Ky.

[73] Assignee: Simplimatic Engineering Company, Lynchburg, Va.

[21] Appl. No.: 590,461

[22] Filed: Sep. 28, 1990

[51] Int. Cl.⁵ .................................................. B65G 21/08
[52] U.S. Cl. .................................. 198/860.2; 198/841; 198/860.1
[58] Field of Search ................ 198/840, 841, 860.1, 198/860.2, 861.1

[56] References Cited

U.S. PATENT DOCUMENTS

| | | | |
|---|---|---|---|
| 3,491,873 | 1/1970 | Fauth | 198/841 X |
| 3,605,994 | 3/1970 | Parlette | 198/861.1 |
| 3,669,244 | 6/1972 | Pagdin et al. | 198/861.1 X |
| 3,779,368 | 12/1973 | Smith | 198/841 |
| 3,800,938 | 4/1974 | Stone | 198/841 |
| 3,825,108 | 7/1974 | Stone | 198/861.1 |
| 3,881,594 | 5/1975 | Jepsen | 198/841 X |
| 4,358,010 | 11/1982 | Besch | 198/841 X |
| 4,390,091 | 6/1983 | Gonzalez | |
| 4,511,031 | 4/1985 | Lachonius | 198/860.2 X |
| 4,593,808 | 6/1986 | Kondo et al. | |
| 4,727,981 | 3/1988 | Johansson | 198/841 |
| 4,951,809 | 8/1990 | Boothe et al. | 198/860.2 X |
| 4,961,492 | 10/1990 | Wiseman et al. | 198/841 |
| 4,993,541 | 2/1991 | Roh | 198/781 |
| 4,993,542 | 2/1991 | Nomura | 198/861.1 X |

Primary Examiner—D. Glenn Dayoan
Assistant Examiner—Tuan N. Nguyen
Attorney, Agent, or Firm—St.Onge Steward Johnston & Reens

[57] ABSTRACT

A conveyor system is provided including conveyor beams, conveyor frame members, conveyor accessory mounting brackets, connectors, wearstrip converters, and various combinations of each. The conveyor beam includes first and second side walls connected in one piece by an integral web, a first flange disposed along at least the tops of the side walls to support a conveyor, and at least two mounting slots on outer surfaces of each side wall. The conveyor frame members comprise at least three mounting slots formed in sides thereof, at least one of the mounting slots open to each of three different directions, and at least one flange disposed along an edge of the frame member to support a conveying surface. The brackets are for mounting conveyor accessories to the conveyor beams and frame members. The connectors are for connecting conveyor beams or frame members together. And the converters are for altering the location or orientation of wearstrips.

23 Claims, 8 Drawing Sheets

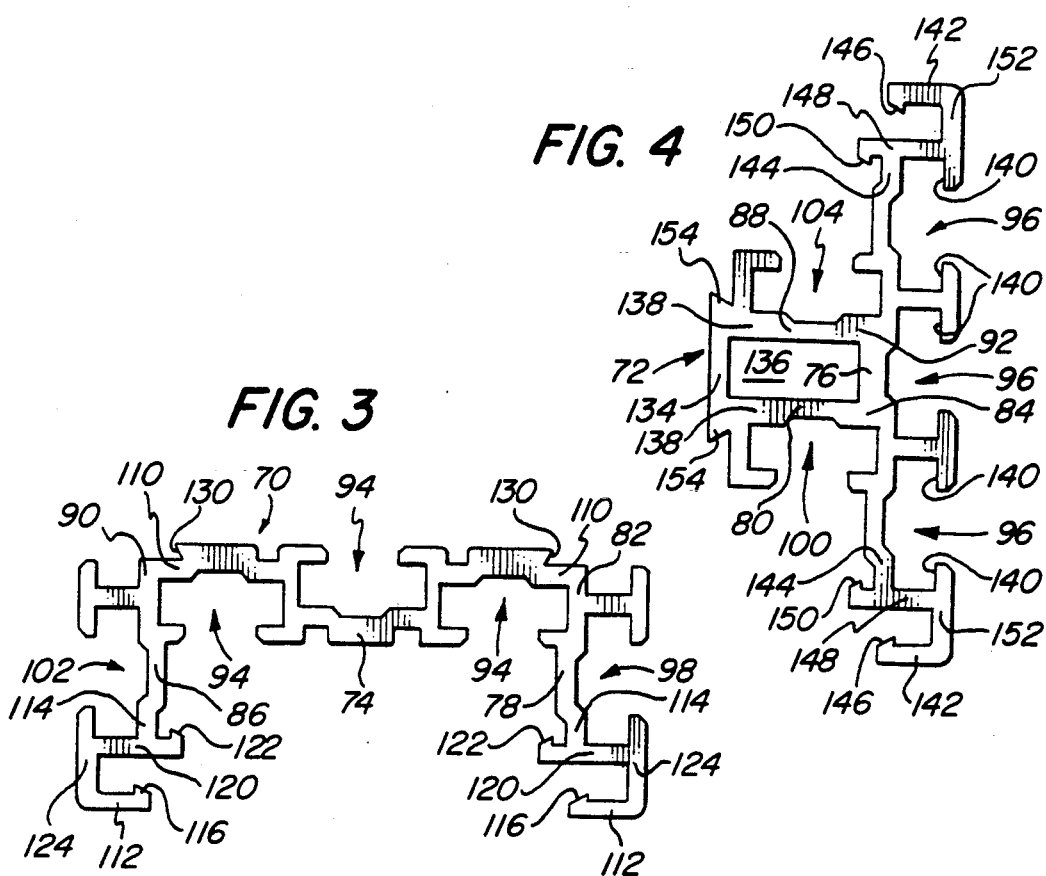

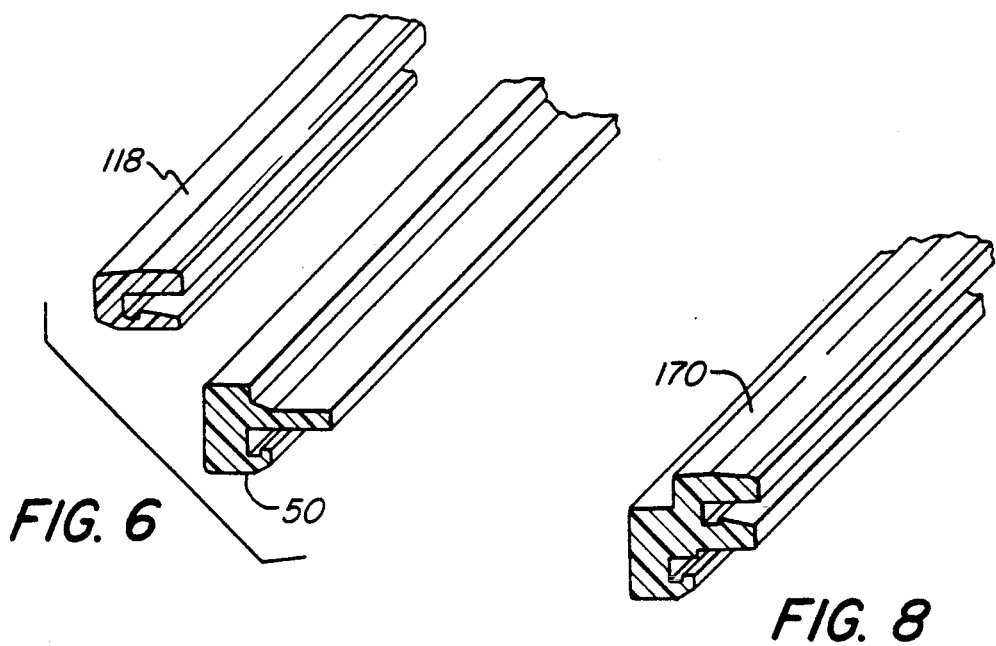
FIG. 6
FIG. 8
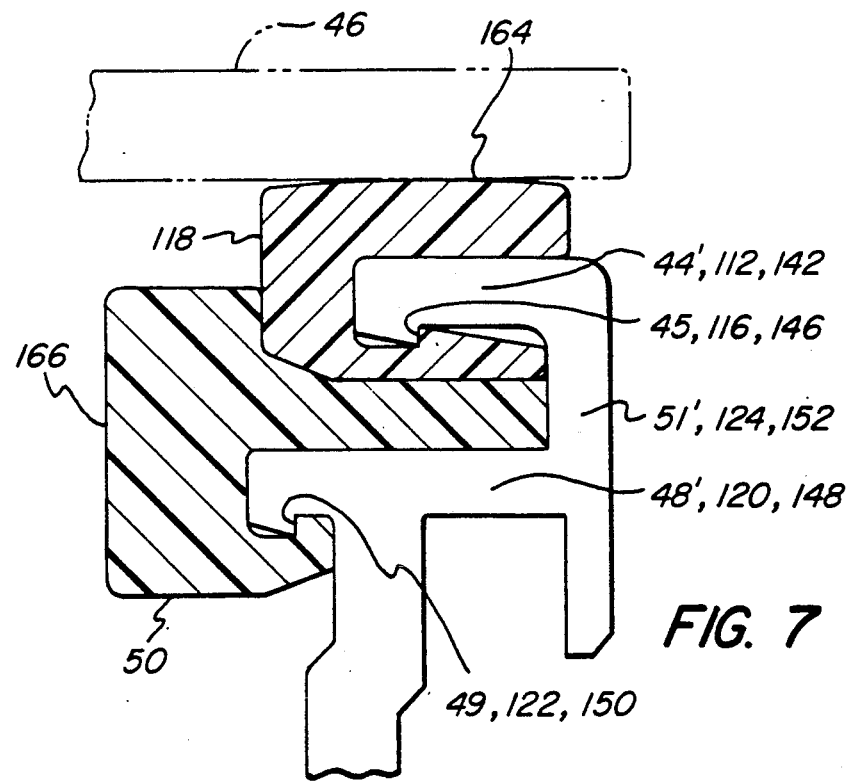
FIG. 7

CONVEYOR SYSTEM

FIELD OF THE INVENTION

This invention relates to conveyor systems and, more specifically, to conveyor systems comprising conveyor beams, conveyor frame members and conveyor accessory mounting means.

BACKGROUND ART

Efforts to improve industrial plant efficiency have spawned interest in making industrial plants relatively quickly and easily convertible from one industrial process to another. Convertibility of industrial plants permits plant managers to stay abreast of and provide for the demands of the market. A crucial component of virtually every industrial plant is conveyor systems. Thus, the convertibility of conveyor systems is crucial to the convertibility of industrial plants. In the conveyor system art, convertibility relates to accommodating articles having various sizes, shapes, physical characteristics, and orientations from workstation to workstation.

Typically, conveyor systems are designed to be used in a particular way to convey a particular article. Some conveyor systems offer marginal levels of modularity or convertibility.

U.S. Pat. No. 3,605,994 to Parlette discloses a pair of frame elements combinable by a coupling member and screws to form a unit frame assembly.

U.S. Pat. No. 3,800,938 to Stone discloses elongated frame members including an inclined web for close spacing of a transfer disk.

U.S. Pat. No 3,825,108 to Stone discloses side frame members having top and bottom flanges with different horizontal dimensions to support different size conveyor chains. The frame members each have two mounting channels or T-slots, and they may be combined with tubular spacers.

U.S. Pat. No. 4,358,010 to Besch discloses a conveyor track having an upwardly open longitudinal slot and a downwardly open T-slot to attach the track to a cross member.

U.S. Pat. No. 4,511,031 to Lachonius discloses a conveyor girder having, at one or both sides thereof, two longitudinal open ducts situated one inside the other and which both can be reached from the outside of the girder.

U.S. Pat. No. 4,593,808 to Kondo et al. discloses a multi-level rack-type conveyor comprising L-shaped members, each having a pair of rollers.

U.S. Pat. No. 4,727,981 to Johansson discloses a conveyor beam for guiding and supporting a flexible track on sliding ledges.

SUMMARY OF THE INVENTION

It is an object of this invention to provide a conveyor which may be converted to accommodate a variety of articles. It is another object of this invention to provide a conveyor beam upon which conveyor accessories may be mounted in various orientations. It is a further object of this invention to provide conveyor frame members which may be mounted together in various configurations to form a conveyor. It is still another object of this invention to provide a conveyor accessory mounting bracket having a lip and key for attaching to a mounting ridge and a mounting slot respectively. It is still a further object of the invention to provide a connector for mounting together two conveyor frame members or conveyor beams having mounting slots. It is yet still another object of the invention to provide a converter for use with a conveyor accessory mounting means to alter the orientation of a wear strip.

These and other objects are achieved by providing a conveyor system comprising conveyor beams, conveyor frame members, conveyor accessory mounting brackets, connectors, wearstrip converters, and various combinations of each, all in accordance with this invention.

The conveyor beam comprises first and second side walls connected in one piece by an integral web, a first flange disposed along at least the tops of the side walls to support a conveyor, and at least two mounting slots on outer surfaces of each side wall. Preferably, the integral web includes at least two mounting slots, and the side walls each includes three mounting slots which most preferably are uniformly spaced apart. Preferably, a second flange disposed along at least the tops of the side walls is adapted to receive a wearstrip.

The conveyor frame members comprise at least three mounting slots formed in sides thereof, at least one of the mounting slots open to each of three different directions, and at least one flange disposed along an edge of the frame member to support a conveying surface. Preferably, the frame member comprises three walls with a mounting slot in each wall. Most preferably, one wall of the frame member includes at least two mounting slots.

The conveyor accessory mounting brackets comprise a mounting plate having a keying portion for attaching to mounting slots on the conveyor beams and frame members, a substantially U-shaped member for receiving a conveyor accessory therein, and an orientation arm for attaching between the mounting plate and the U-shaped member to orient the U-shaped member. The brackets preferably include a lip portion on the mounting plate, and inwardly extending lips from ends of the U-shaped member.

The connectors comprise a body, a pair of fingers extending from opposite sides of the body and a lip extending from each of the fingers in a direction opposite the other finger in the pair.

The wearstrip converters comprise means for attaching the converter to a guide rail mounting means, a first surface adapted to receive a wearstrip disposed in a direction different than the guide rail, and a second surface adapted to receive a wearstrip in a direction different than either the guide rail or the direction of the first surface. Preferably, the converter includes a third surface adapted to receive a wearstrip, and the three surfaces meet in two common edges.

The invention and its particular features will become more apparent from the following detailed description when considered with reference to the accompanying drawings.

BRIEF DESCRIPTION OF THE DRAWINGS

FIG. 2 is cross-sectional view of the conveyor beam of FIG. 1.

FIG. 3 is a cross-sectional view of a frame member in accordance with this invention substantially comprising one-half of the conveyor beam of FIG. 1.

FIG. 4 is a cross-sectional view of another embodiment of the frame member of FIG. 3.

FIG. 6 is a perspective view of wearstrips for mounting on the conveyor beam of FIG. 1.

FIG. 7 is an enlarged cross-sectional partial view of the conveyor beams of FIGS. 1 or 5, or the frame members of FIGS. 3 or 4, having the wearstrips of FIG. 6 mounted thereon.

FIG. 8 is a perspective view of another embodiment of the wearstrips of FIG. 6.

DETAILED DESCRIPTION OF THE INVENTION

Figure 1:
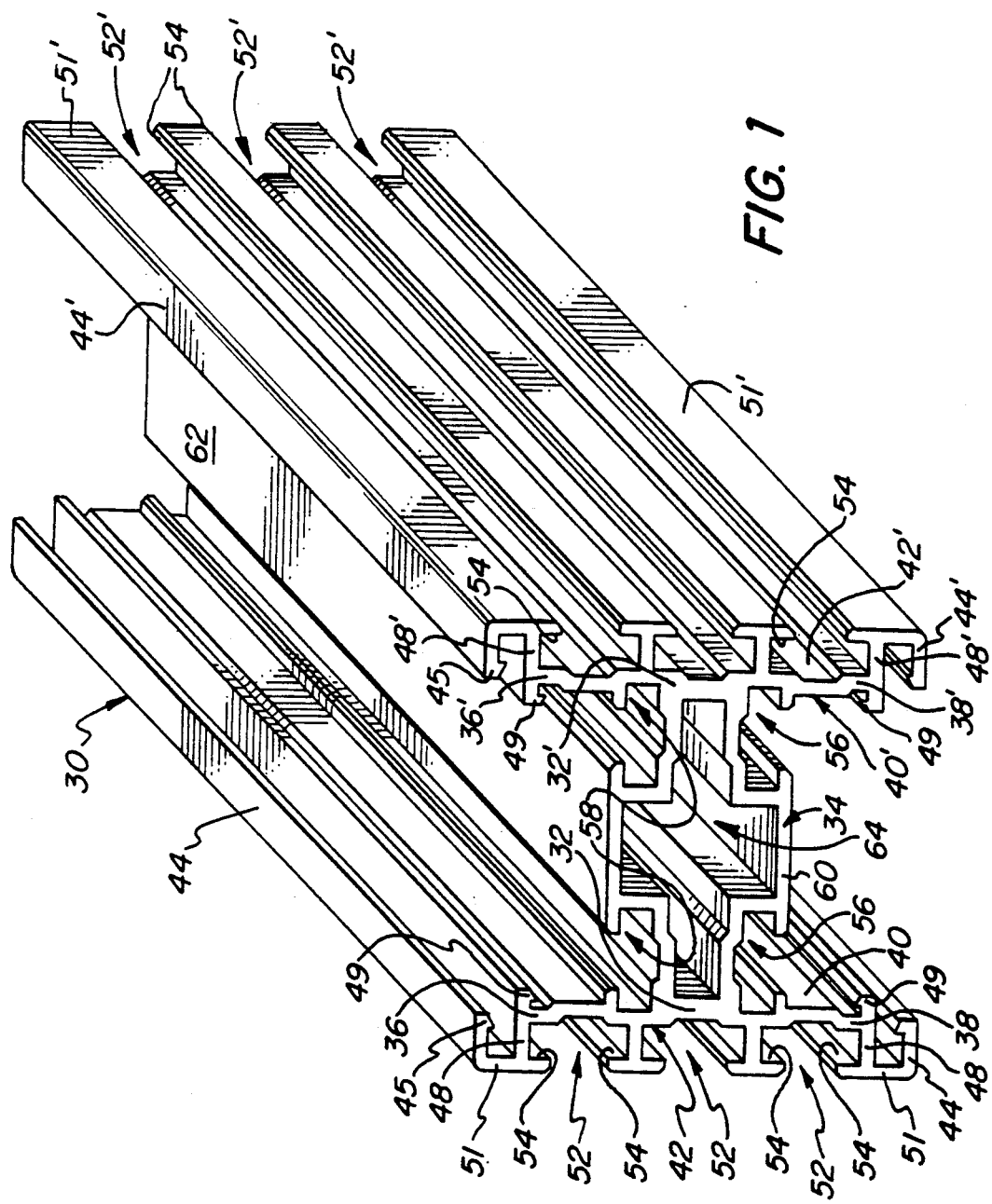
FIG. 1 is a perspective view of a conveyor beam in accordance with this invention.

FIG. 1 is a perspective view and FIG. 2 is a cross-sectional view of a conveyor beam 30 in accordance with this invention. Conveyor beam 30 extends longitudinally and comprises longitudinally extending first and second substantially vertical side walls 32, 32'; and a web 34 integrally connecting side walls 32, 32' together in spaced-apart relation. Conveyor beam 30 preferably consists primarily of aluminum or an aluminum alloy and is preferably formed by extrusion.

Side walls 32, 32' have upper or top edges or ends 36, 36'; lower or bottom edges or ends 38, 38'; inner surfaces 40, 40'; and outer surfaces 42, 42'. Longitudinally extending first flanges 44, 44' are attached near at least upper edges 36, 36' of side walls 32, 32'. First flanges 44, 44' are preferably attached near lower edges 38, 38' as well. First flanges 44, 44' are adapted, preferably disposed substantially horizontally and provided with a lip 45, to support a conveying means 46 (not shown in these FIGS., see FIG. 7).

Conveyor beam 30 preferably also includes longitudinally extending second flanges 48, 48' attached at least at upper edges 36, 36' of side walls 32, 32'. Second flanges 48, 48' are most preferably attached near lower edges 38, 38' as well. Second flanges 48, 48' are adapted, preferably by provision of a lip 49, to receive a wearstrip 50, not shown in these FIGS., but shown and described below with reference to FIGS. 6-8. First flanges 44, 44' and second flanges 48, 48' are connected together, preferably in substantially parallel relation, by longitudinally extending upright members 51, 51'.

At least two, and preferably three, outwardly open mounting slots or T-shaped channels 52, 52' for mounting conveyor accessories along conveyor beam 30 are formed in or on outer surfaces 42, 42' of side walls 32, 32' of conveyor beam 30. Mounting slots 52, 52' are most preferably substantially the same size and spaced-apart substantially the same distance in substantially parallel relation.

Each mounting slot 52, 52' includes mounting ridge 54. Thus, conveyor beam 30 comprises at least two, and preferably three, mounting ridges 54 on each side wall 32, 32'. It is understood that although mounting ridge 54 is illustrated as an integral part of mounting slots 52, 52' it need not be. Indeed, mounting ridge 54 may be independently formed in or on outer surfaces 42, 42' of side walls 32, 32' so long as they are spaced-apart from and preferably substantially parallel to mounting slots 52, 52' as will become apparent from the below description of its function with reference to FIGS. 15-18.

Connecting web 34 is preferably substantially horizontally disposed and is integrally connected in one piece with inner surfaces 40, 40' of side walls 32, 32' to form conveyor beam 30. Preferably, connecting web 34 comprises at least one, and most preferably two, downwardly open mounting slots or T-shaped channels 56. Mounting slots 56 are most preferably substantially the same size, and also sized to match mounting slots 52, 52'. Preferably, connecting web 34 also comprises at least one, and most preferably two, upwardly open mounting slots or T-shaped channels 58. Mounting slots 58 are most preferably substantially the same size, and also sized to match mounting slots 56, and also sized to match mounting slots 52, 52'.

Connecting web 34 preferably includes lower connecting wall 60 and an upper connecting wall 62 which together form a central opening 64 to reduce the weight of conveyor beam 30. In this regard, downwardly open mounting slots 56 are preferably formed in or on lower connecting wall 60 and upwardly open mounting slots 58 are preferably formed in or on upper connecting wall 62.

FIGS. 3 and 4 are cross-sectional views of longitudinally extending conveyor frame members 70 and 72 respectively. Frame members 70 and 72 each generally comprise one-half of conveyor beam 30 (FIGS. 1 and 2), and more specifically comprise first walls 74, 76; second walls 78, 80 having first ends 82, 84 attached, preferably at substantially right angles, to first walls 74, 76; and third walls 86, 88 also having first ends 90, 92 attached, preferably at substantially right angles, to first walls 74, 76 spaced apart from second walls 78, 80.

First walls 74, 76 of frame members 70, 72 include three, preferably uniformly spaced-apart substantially the same size, mounting slots 94, 96. Preferably, mounting slots 94, 96 are open to directions aligned substantially in parallel with both second walls 78, 80 and third walls 86, 88. Fourth mounting slots 98, 100 are formed in second walls 78, 80; and fifth mounting slots 102, 104 are formed in third walls 86, 88. Fourth mounting slots 98, 100 and fifth mounting slots 102, 104 are preferably open to opposite directions and to directions substantially parallel to first walls 74, 76. Thus, frame members 70, 72 preferably have mounting slots open to at least three different directions. It is further to be understood that conveyor beam 30 (see FIGS. 1 and 2) comprises a frame member in its most general sense.

Turning now to FIG. 3 and later to FIG. 4, consideration will be made of the differences between frame members 70, 72. Second wall 78 and third wall 86 of frame member 70 are preferably mounted at ends 110 of first wall 74. Mounting slots 94 of first wall 74 are preferably formed such that two open in one direction while the third opens in a different, most preferably the opposite, direction.

Longitudinally extending first flanges 112 are attached near second ends 114 of second wall 78 and third wall 86 of frame member 70. First flanges 112 are adapted to support conveying means 46 (see FIG. 7) and in this regard include a lip 116 for retaining a wearstrip 118 not shown in this FIG., but shown and described below with reference to FIGS. 6-8.

Frame member 70 also includes longitudinally extending second flanges 120 attached at second ends 114 of second wall 78 and third wall 86. Second flanges 120 are adapted, preferably by provision of a lip 122, to receive wearstrips 50, 50' (see FIGS. 6-8). First flanges 112 and second flanges 120 of frame member 70 are connected together, preferably in substantially parallel relation, by longitudinally extending upright members 124.

Frame member 70 also preferably includes dovetail grooves 130 formed near ends 110 of first wall 74, each for aligning another frame member 70, 72 therewith. Once properly aligned, other frame members may be clamped or otherwise fastened together by a variety of means. Provision of dovetail grooves 130 permits frame members 70, 72 to be combined together along their lengths in any of a variety of configurations to accommodate multifarious articles and industrial processes.

Referring now only to FIG. 4, second wall 80 and third wall 88 of frame member 72 are preferably mounted in spaced-apart relation and connected by a fourth wall 134 spaced-apart from first wall 76 to form a central opening 136. Preferably, fourth wall 134 is attached at second ends 138 of second wall 80 and third wall 88, and is aligned substantially in parallel with first wall 76.

Mounting slots 96 of first wall 76 preferably all open to substantially the same direction opposite second wall 80 and third wall 88. Each mounting slot 96 includes at least one mounting ridge or groove 140 the function of which will be described below with reference to FIGS. 9-11 and 15-18.

Longitudinally extending first flanges 142 are attached near ends 144 of first wall 76 of frame member 72. First flanges 142 are adapted to support conveying means 46 (see FIG. 7) and in this regard include a lip 146 for retaining a wearstrip 118 (see FIGS. 6-8).

Frame member 72 also includes longitudinally extending second flanges 148 attached at ends 144 of first wall 76. Second flanges 148 are adapted, preferably by provision of a lip 150, to receive wearstrips 50 (see FIGS. 6-8). First flanges 142 and second flanges 148 of frame member 72 are connected together, preferably in substantially parallel relation, by longitudinally extending upright members 152.

Frame member 72 also preferably includes dovetail grooves 154 formed near ends fourth wall 134, each aligning another frame member 70, 72 therewith. In this regard, dovetail grooves 154 of frame member 72 are sized to match dovetail grooves 130 of frame member 70.

Figure 5:
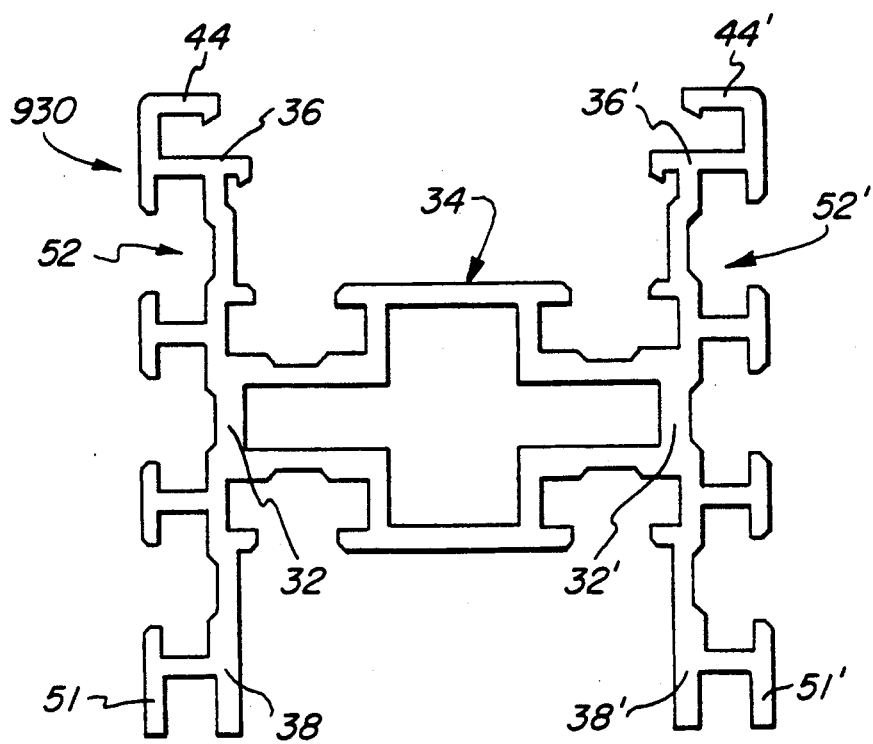
FIG. 5 is a cross-sectional view of another embodiment of the conveyor beam of FIG. 1.

Referring now to FIG. 5, a cross-sectional view is provided of conveyor beam 930, an alternative embodiment of conveyor beam 30 of FIGS. 1 and 2. Conveyor beam 930 has many identical parts to conveyor beam 30, some of which appear identically numbered. Rather than connecting first and second flanges, vertical uprights 51, 51' of conveyor beam 930 connect lower ends 38, 38' of first and second side walls 32, 32' to third and fourth substantially vertical side walls 160, 160'. Third and fourth side walls 160, 160' each include a mounting slot 162, 162'. Although other uses are possible, mounting slots 162, 162' may conveniently be used to mount a motor or the like (not shown) for energizing conveying means 46 (see FIG. 7). In this regard, side walls 160, 160' may serve as chain or belt guards.

FIG. 6 is a perspective view of longitudinally extending wearstrips 118 and 50 for respectively mounting on first flanges 44', 112, 142 and second flanges 48', 20, 148 of both conveyor beams 30, 930 and conveyor frame members 70, 72 as shown in the enlarged cross-sectional partial view of FIG. 7. Wearstrip 118 primarily provides a track or runway 164 over which conveying means 46 may slide. Wearstrip 50 provides an inwardly extending guard or guide 166 and may also serve to retain conveying means 46 within conveyor beams or frame members during vertical turns. Although they can be used separately, wearstrips 50 and 118 may conveniently be provided as a single wearstrip 170 as illustrated in FIG. 8.

Figure 9:
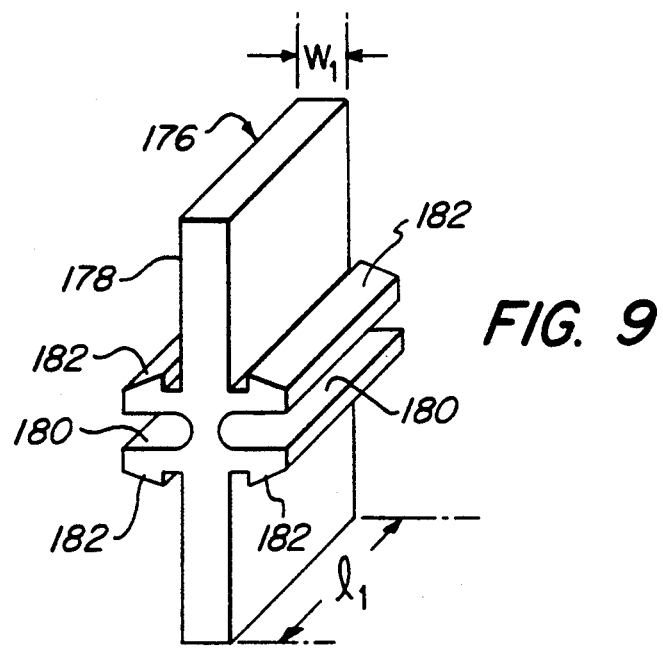
FIG. 9 is a perspective view of a connector in accordance with this invention for mounting together the conveyor beams of FIG. 1.
Figure 10:
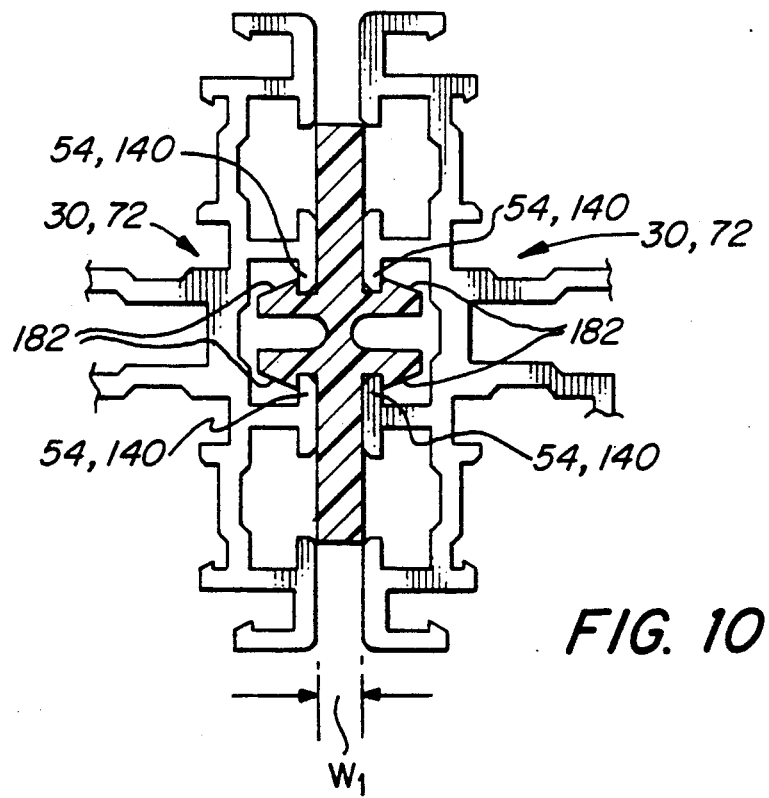
FIG. 10 is a cross-sectional partial view of two conveyor beams of FIG. 1 and/or the conveyor frame members of FIG. 4 mounted together by the connector of FIG. 9.

FIG. 9 is a perspective view of connector 176 in accordance with this invention for mounting together two conveyor beams 30 and/or conveyor frame members 72 as shown in the cross-sectional view of FIG. 10. It is understood that connector 176 may also be used to combine conveyor beams 930 and/or conveyor frame members 70. Connector 176 comprises a body 178 and a pair of spaced-apart substantially parallel fingers 180 extending from opposite sides of body 178.

Body 178 may be of any width $w_1$ to separate conveyor beams 30 the spaced-apart distance. Similarly, body 178 may be of any length $l_1$ so that either single longitudinally extending connector 176 or a plurality of shorter connectors 176 may be used.

Fingers 180 are formed from slightly resilient polymeric material. Conveniently, body 178 is also formed from polymeric material so that connector 176 may be molded in one piece. Although pairs of fingers 180 are shown attached to body 178 directly opposite each other, they can also be offset in order to create various conveyor systems.

Each finger 180 includes a lip 182 extending therefrom in a direction opposite the other finger 180 in said pair of fingers. Lips 182 are designed to engage, for example mounting ridges 54 of mounting slots 52, 52' of conveyor beams 30, and/or mounting grooves 140 of mounting slots 96 of conveyor frame members 72 as fingers 180 of connector 176 are pressed into mounting slots 52, 52' and/or 96. In this manner, conveyor beams 30, 930 and/or conveyor frame members 70, 72 may be combined together in side-by-side substantially parallel, spaced-apart relation.

Figure 11:
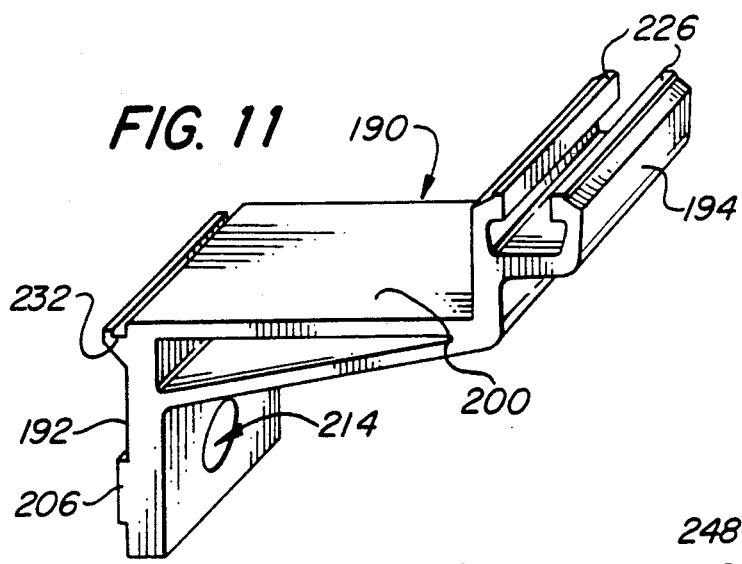
FIGS. 11 and 12 are perspective views of two embodiments of conveyor accessory mounting brackets in accordance with this invention for attaching to the conveyor beam of FIG. 1.
Figure 12:
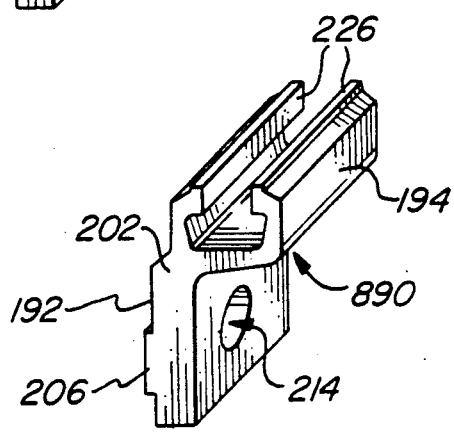
Figure 13:
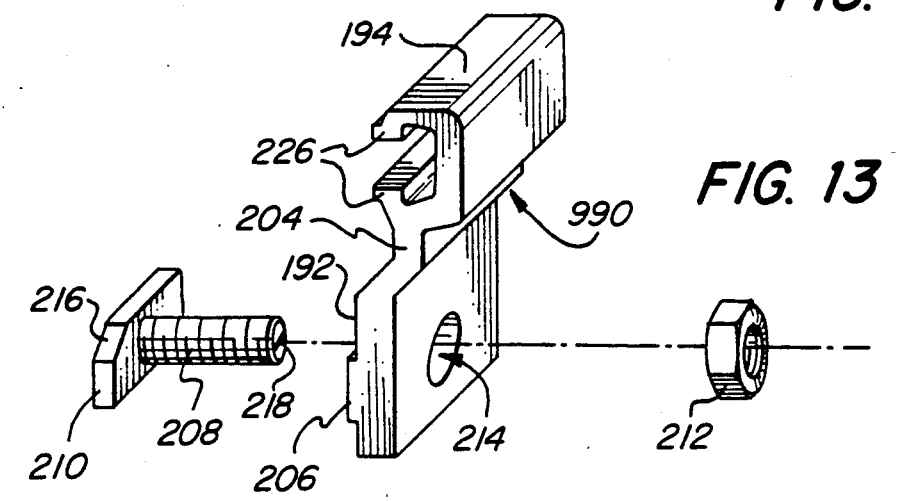
FIG. 13 is a perspective view of another embodiment of the conveyor accessory mounting brackets of FIGS. 11 and 12 including a fastener.

FIGS. 11-13 are perspective views of conveyor accessory mounting brackets 190, 890 and 990 respectively. Brackets 190, 890, 990 each include a mounting plate 192; a substantially U-shaped member 194 for receiving either a conveyor accessory such as a wearstrip or guide rail 196 (not shown in these FIGS., see FIG. 16), or an attaching means such as wedges or wedge-shaped members 198 (not shown in these FIGS., see FIGS. 20-22) therein; and orientation arms 200, 202 and 204 respectively.

Mounting plates 192 comprise a key or keying portion 206 which mates with any of the mounting slots on conveyor beams 30, 930 or conveyor frame members 70, 72. In this regard, brackets 190, 890, 990 may be mounted in a variety of positions to virtually every side of the conveyor beams and frame members for maximum flexibility in presenting conveyor accessories, such as guide rails to a particular conveyor system. The only limitation to placement of a bracket is the geometry of the bracket relative to the location of the mounting slot.

Figure 14:
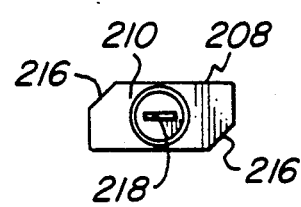
FIG. 14 is an end elevation view of the fastener of FIG. 13.

Referring to FIG. 13, a fastener for brackets 190, 890, 990 includes a bolt 208, having a custom head 210 and a nut 212. Bolt 208 passes through a hole 214 in key 206 and in mounting plate 192 to secure the brackets to a given mounting slot. FIG. 14 is an end elevation view of bolt 208, illustrating the unusual shape of head 210, i.e. sloped corners 216 of an erstwhile rectangle. Screwdriver slot 218 or the like in the end of bolt 208 enables nut 212 to be tightened down, fastening bracket 190, 890, 990 to a given mounting slot, and also permits head 210 to be rotated such that sloped corners 216 lie flush against inside sides 220 of the mounting slot forming a secure attachment as illustrated in FIG. 22.

Returning now to FIGS. 11-13, substantially U-shaped members 194 preferably include inwardly extending lips 226 at both ends thereof. Lips 226 function to help retain and secure conveyor accessories received therein.

Figure 22:
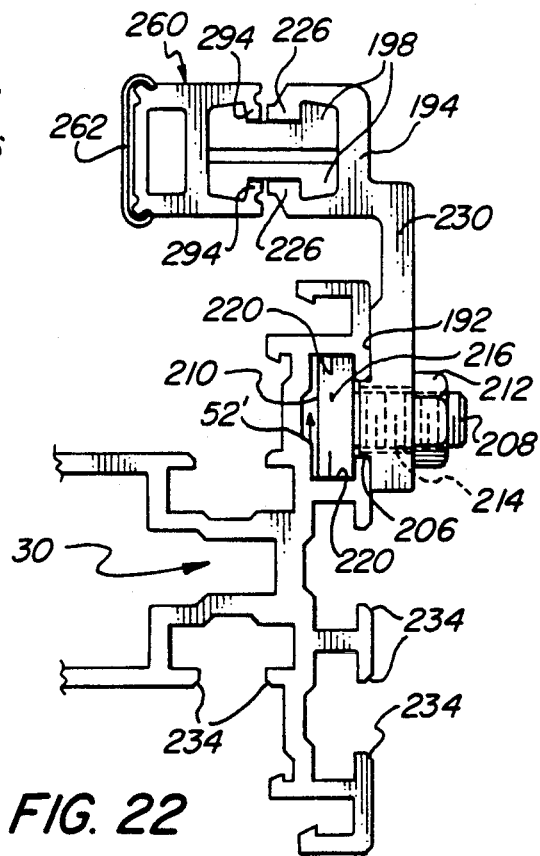
FIG. 22 is a cross-sectional partial view of the conveyor beam of FIG. 1 depicting attachment thereto of a conveyor accessory mounting bracket including the converter of FIG. 19.

Although three orientation arms 200, 202, 204 are illustrated in these FIGS., it is understood that many other orientation arms are possible, such as arm 230 in FIG. 22. Orientation arms 200, 202, 204 are each attached at one end to mounting plate 192 and at another end to U-shaped member 194. The function of arms 200, 202, 204, 230 is to orient substantially U-shaped members 194 with respect to mounting plates 192 offering a variety of conveyor accessory presentations and thus accommodating a variety of articles and industrial processes.

Referring now to FIG. 11, orientation arm 200 and others with similar geometries may generate a disadvantage amount of torque or leverage on bolt 208, key 206 or mounting plate 192. To insure secure attachment of brackets such as bracket 190 to the mounting slots of conveyor beams and frame members, mounting plate 192 may in accordance with the invention include a lip or lip portion 232. Key 206 mates with a mounting slot 52, 52', 96, while lip 232 engages mounting ridge or groove 54, 140. As described above with reference to FIGS. 1, 2 and 4, mounting ridges 54, 140 preferably comprise mounting slots 52, 52', 96, and the mounting slots are preferably substantially parallel and spaced-apart substantially the same distance. Thus, bracket 190 can be variously attached to different pairs of mounting slots on conveyor beams 30, 90 or conveyor frame members 72.

Figure 16:
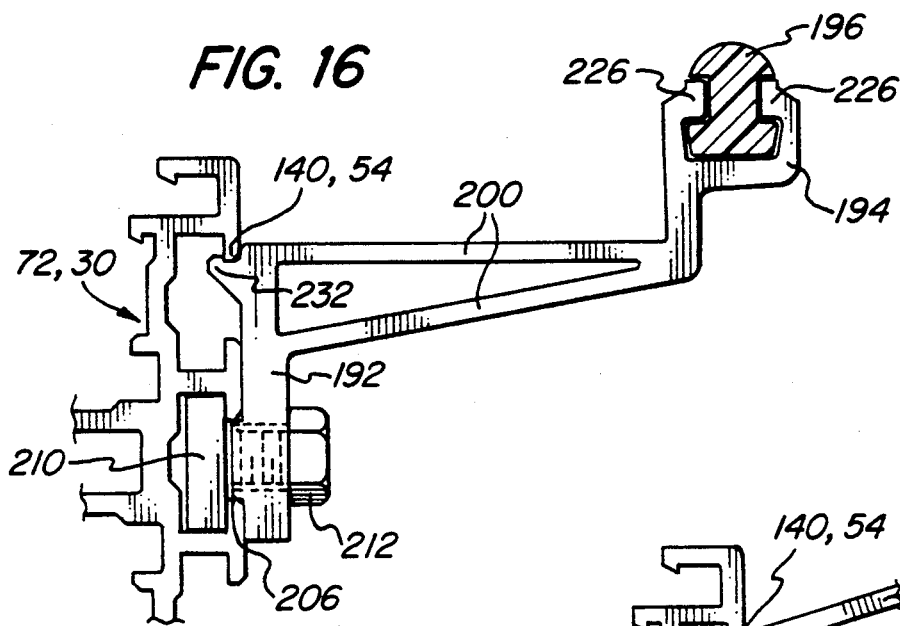
FIGS. 16 and 17 are cross-sectional partial views of the conveyor beam of FIG. 1 depicting how a conveyor accessory mounting bracket may be attached thereto.
Figure 17:
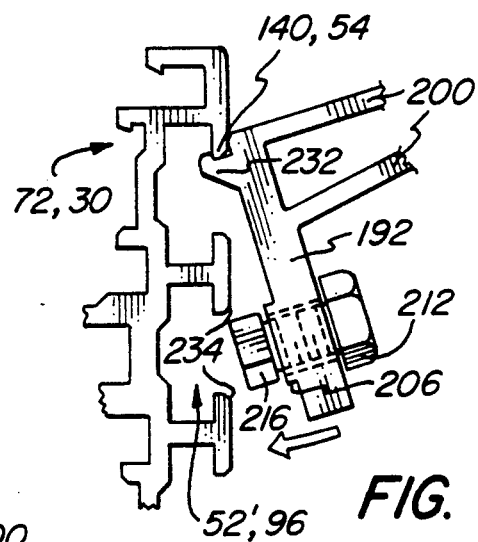

Referring now to FIGS. 16 and 17, these FIGURES are cross-sectional views of conveyor beams 30, 930 or conveyor frame members 72, illustrating how bracket 190 is attached thereto by engaging mounting ridge 140, 54 with lip 232 and rotating the bracket as indicated by the arrow in FIG. 17 to bring key 206 into position in mounting slot 52, 52', 96. Mounting slots 52, 52', 96 and any other mounting slots may be provided with bevels 234 at their opening edges to increase the ease with which keys 206 may be located therein.

Figure 15:
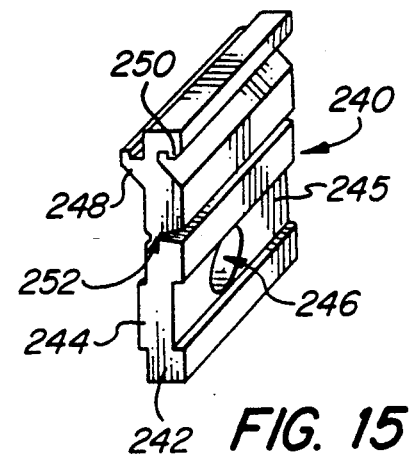
FIG. 15 is a perspective view of a spacer for attaching between a conveyor accessory mounting bracket and the conveyor beam of FIG. 1.
Figure 18:
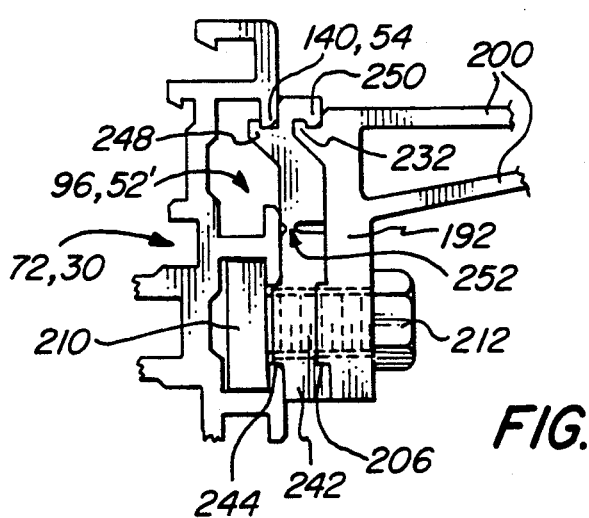
FIG. 18 is a cross-sectional partial view of the conveyor beam of FIG. 1 depicting how the spacer of FIG. 5 may be mounted between a conveyor accessory mounting bracket and the conveyor beam.

FIG. 15 is a perspective view of a spacer 240, one or more of which may be used to alter the orientation of mounting plate 192 with respect to mounting slots 52, 52', 96 on a given conveyor beam 30, 930 or conveyor frame member 72 as illustrated in FIG. 18. Use of spacer 240 may be desirable to alleviate geometrical problems between a bracket such as a bracket 190 illustrated and a particular conveyor system, or to alter the orientation of substantially U-shaped member 194 (not shown in this FIG., see FIGS. 11-13, 16 and 22) with respect to mounting slots 96, 52', 52 or otherwise.

Spacer 240 comprises a mounting plate 242, a key or key portion 244, a channel 245 located directly opposite key 244, a hole 246 through mounting plate 242 and key 244 for passage of bolt 208, a lip or lip portion 248, and a mounting ridge 250 located directly opposite lip 248. Mounting ridge 250 and channel 245 function the same as mounting ridges 140, 54 and mounting slots 96, 52', 52 on conveyor beams 30, 930 and/or frame members 72 to respectively be engaged by lip 232 and mated by key 206 of conveyor accessory brackets such as bracket 190. Similarly, lip 248 and key 244 function the same as lip 32 and key 206 of bracket 190 to respectively engage mounting ridges 140, 54 and mate with mounting slot 96, 52' of conveyor beams 30, 930 and/or frame members 72.

Although not specifically illustrated, spacer 240 may also be used in substantially the same manner but without lip 248 to achieve similar advantages, for example, with brackets such as bracket 890, 990 which do not include lip 232 but only key 206 and also with conveyor frame member 70. In this regard, spacer 240 preferably comprises a score line or break line 252 which enables lip portion 248 of mounting plate 242 to be broken away.

Figure 19:
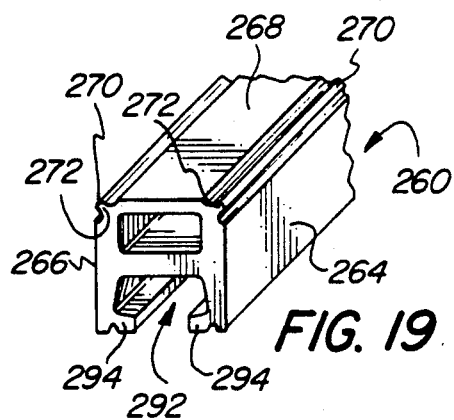
FIG. 19 is a perspective view of a converter in accordance with this invention for orienting a wearstrip mountable to the conveyor beam of FIG. 1 by a conveyor accessory mounting bracket.
Figure 21:
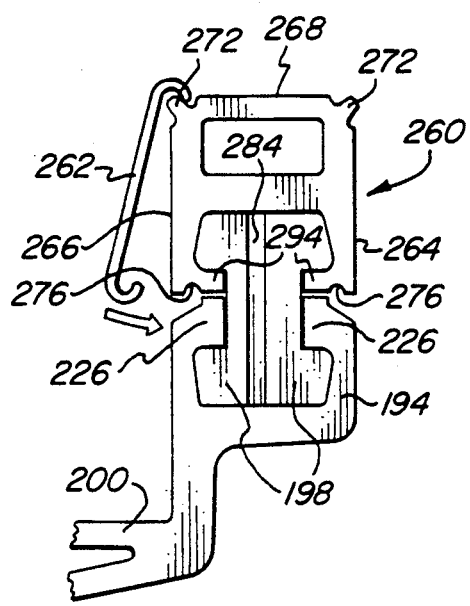
FIG. 21 is a partial end view of a conveyor accessory mounting bracket depicting attachment thereto of the converter of FIG. 19 with the wedges of FIG. 20, and depicting attachment of a wearstrip to the converter.

FIG. 19 is a perspective view of a converter 260 in accordance with this invention for altering the location and orientation of wearstrips 262 (not shown in this view, see FIGS. 21-22) attached as conveyor accessories to substantially U-shaped members 194. FIG. 16, for example, depicts a guide rail wearstrip 196 mounted directly to substantially U-shaped member 194. FIGS. 21 and 22, however, depict alternative wearstrip 262 mounted to converter 260 which itself may be attached to substantially U-shaped members 194.

Converter 260 is preferably longitudinally extending and comprises a first surface 264 normal to a direction different than a direction in which wearstrip 196 would be disposed, i.e., the open side of substantially U-shaped members 194; and a second surface 266 normal to a direction different than both the direction of first surface 264 and the direction in which wearstrip 196 would be disposed. Preferably, first and second surfaces 264, 266 are substantially planar. Converter 260 preferably also includes a third surface 268, having a normal substantially parallel to the direction in which wearstrip 196 would be disposed. It is understood that any number of surfaces is possible.

Each of the surfaces 264, 266, 268 has at least one edge 270 substantially in common with another surface. Preferably, surfaces 264, 266, 268 meet in common edges 270 substantially at right angles. Common edges 270 have protuberances 272 to which wearstrips 262 may be mounted along either of the surfaces forming the common edge. Edges 274 of surfaces 264, 266 which are not common edges 270 are provided with channels 276 along back sides of the surfaces for retaining wearstrips 262 which may be snapped into place as illustrated in FIG. 21. It is understood that protuberances 272 merely comprise channels on both surfaces meeting in common edges 270.

Figure 20:
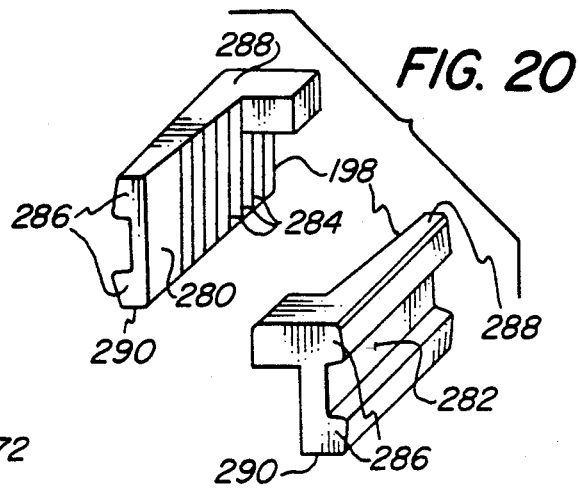
FIG. 20 is a perspective view of a pair of wedges for attaching the converter of FIG. 19 to a conveyor accessory mounting bracket.

Converter 260 may be attached to substantially U-shaped members 194 by means such as wedges 298 shown in a perspective view in FIG. 20. Wedges 198 each comprise inner surfaces 280 and outer surfaces 282. Inner surfaces 280 include a plurality of ridges 284 for releasably locking with ridges on the other wedge. Fingers 286 extend outwardly from outer surfaces 287 of wedges 198 at both their upper edges 288 and lower edges 290. Upper and lower fingers 286 function in pairs to releasably lock the pair of wedges 198 to both U-shaped member 194 and converter 260 as illustrated in FIGS. 21 and 22. In this regard, converter 260 is provided with a substantially U-shaped passage 292 having inwardly extending lips 294 at the ends thereof like substantially U-shaped member 194 with lips 226.

In use, wedges 198 may be inserted into both converter 260 and U-shaped member 194 while relatively longitudinally separated. Thereafter, wedges 198 may be relatively longitudinally aligned to releasably lock ridges 284 and securely fasten converter 260 to U-shaped member 194. Preferably, wedges 198 are provided with ears 285 attached to inner surfaces 280 at the thicker ends thereof. Ears 285 enable a screwdriver or other pry bar to be inserted therebehind when wedges 198 are "locked" to conveniently release or unlock the wedges.

The conveyor system disclosed may be configured in many ways, all of which cannot possibly be illustrated. It is understood, however, that the conveyor system components of conveyor beams, conveyor frame members, connectors, conveyor accessory mounting brackets and wearstrip converters are susceptible to a variety of combinations, and further may be relatively quickly and easily converted from one combination or configuration to another in order to accommodate various articles and industrial processes.

Although the invention has been described with reference to particular embodiments, features, materials of construction and the like, these are not intended to exhaust all possible features, and indeed any other modifications and variations will be ascertainable to those of skill in the art.

What is claimed is:

1. A conveyor beam comprising:
   first and second longitudinally extending substantially vertical side walls having top and bottom edges and having inner and outer surfaces;
   a longitudinally extending substantially horizontal web integrally connecting said first and second side walls together, in spaced-apart relation, at the inner surfaces of said side walls to form a longitudinally extending single piece;
   a longitudinally extending first flange disposed along at least one edge of each of said first and second side walls;
   a longitudinally extending second flange disposed along at least said one edge of each of said first and second side walls;
   said first and second flanges extending in substantially the same direction from each of said first and second side walls, said first and second flanges being adapted to receive wearstrips; and
   at least two longitudinally extending mounting slots formed in spaced-apart relation on the outer surface of each of said first and second side walls.

2. The conveyor beam of claim 1 comprising three spaced-apart longitudinally extending mounting slots formed on the outer surfaces of each of said first and second side walls, said mounting slots being substantially the same size.

3. The conveyor beam of claim 1 including at least one additional longitudinally extending mounting slot downwardly disposed and formed in said integral connecting web.

4. The conveyor beam of claim 1 including at least one additional longitudinally extending mounting slot upwardly disposed and being formed in said integral connecting web.

5. The conveyor beam of claim 1 comprising of metal taken from the group consisting of aluminum and aluminum alloys.

6. The conveyor beam of claim 1 wherein said first and second flanges on each of said first and second side walls are connected together in spaced-apart substantially parallel relation by a longitudinally extending member.

7. The conveyor beam of claim 1 wherein said first and second flanges extend from said one edge on one of said first and second side walls toward the other of said first and second side walls.

8. The conveyor beam of claim 1 comprising first and second flanges along top and bottom edges of each of said first and second side walls.

9. A longitudinally extending conveyor beam having a cross section, the cross section comprising:
   first and second substantially vertical side walls, each having top and bottom ends, and each having inner and outer surfaces;
   means for integrally connecting said first and second side walls together, in spaced-apart relation, at their inner surfaces to form a single piece, said connecting means comprising upper and lower connecting walls spaced-apart to form a central opening in said connecting means;
   a first flange disposed near at least each of the top ends of said first and second side walls, said first flanges being adapted to support a conveying means;
   a second flange disposed near at least each of the top ends of said first and second side walls;
   said first and second flanges extending from the top ends of one of said first and second side walls toward the other of said first and second side walls; and at least two spaced-apart, outwardly open mounting slots formed in the outer surface of each of said first and second side walls.

10. The conveyor beam cross section of claim 9 including at least one upwardly open mounting slot formed in the upper connecting wall of said connecting means, and including at least one downwardly open mounting slot formed in the lower connecting wall of said connecting means, and wherein said outwardly open, said upwardly open and said downwardly open mounting slots are of substantially the same size.

11. The conveyor beam of claim 9 wherein said first and second flanges on each of the top ends of said first and second side walls are connected together in a spaced-apart substantially parallel relation by a longitudinally extending member.

12. The conveyor beam of claim 9 including first and second flanges disposed near each of the bottom ends of said first and second side walls.

13. A conveyor system comprising:
   at least one conveyor beam comprising
      first and second longitudinally extending substantially vertical side walls having upper and lower edges an having inner and outer surface,
      a longitudinally extending web integrally connecting said first and second side walls together in spaced-apart relation at the inner surfaces of said side walls,
      a longitudinally extending first flange disposed along at least the upper edges of each of sad first and second side walls and being adapted to support an endless conveying means,
      a longitudinally extending second flange disposed along at least the upper edges of each of said first and second side walls and being adapted to receive wearstrips,
      said first and second flanges extending from the upper edges of one of said first and second side walls toward the other of said first and second side walls,
      at least one longitudinally extending mounting slot formed on the outer surface of each of said first and second side walls,
   a plurality of conveyor accessories; and
   a plurality of means for mounting said conveyor accessories along the conveyor beam in said mounting slots.

14. The conveyor system of claim 13 comprising three said mounting slots formed on the outer surface of each of said side walls.

15. The conveyor system of claim 13 including longitudinally extended first and second flanges disposed along the lower edges of each of said first and second side walls.

16. The conveyor system of claim 13 wherein said first and second flanges extend in substantially the same direction from each of said first and second side walls.

17. The conveyor system of claim 13 including at least one additional longitudinally extending mounting slot downwardly disposed and formed in said integral connecting web.

18. The conveyor system of claim 13 including at least one additional longitudinally extending mounting slot upwardly disposed and formed in said integral connecting web.

19. A longitudinally extending conveyor frame member for supporting an endless conveying surface comprising:
   at least three longitudinally extending mounting slots formed in sides of said frame member;
   at least one of said mounting slots open to a first direction;
   at least one of said mounting slots open to a second direction, said second direction substantially opposite to said first direction;
   at least one of said mounting slots open to a third direction;
   a longitudinally extending first flange disposed along an edge of said frame member, said first flange being adapted to support one side of the endless conveying surface; and
   a longitudinally extending second flange disposed along the edge of said frame member;
   said first and second flanges extending from the edge of said frame member in substantially the same direction.

20. The frame member of claim 19 wherein at least four longitudinally extending mounting slots are formed in sides of said frame member.

21. The frame member of claim 20 wherein at least one of said mounting slots is open to a fourth direction.

22. The conveyor frame member of claim 21 wherein said fourth direction is substantially opposite to said third direction.

23. The conveyor frame member of claim 19 wherein said third direction is substantially perpendicular to said first direction.

* * * * *